(No Model.)
C. W. SALADEE.
VEHICLE SPRING.
No. 275,417. Patented Apr. 10, 1883.
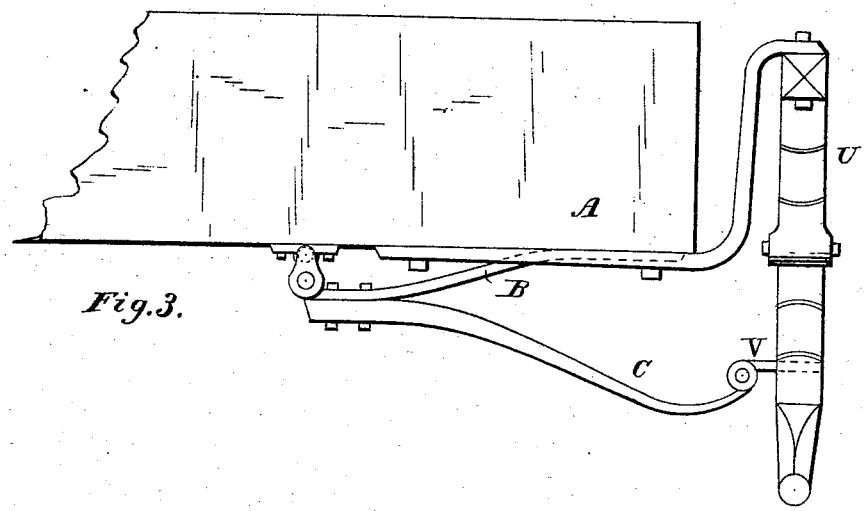
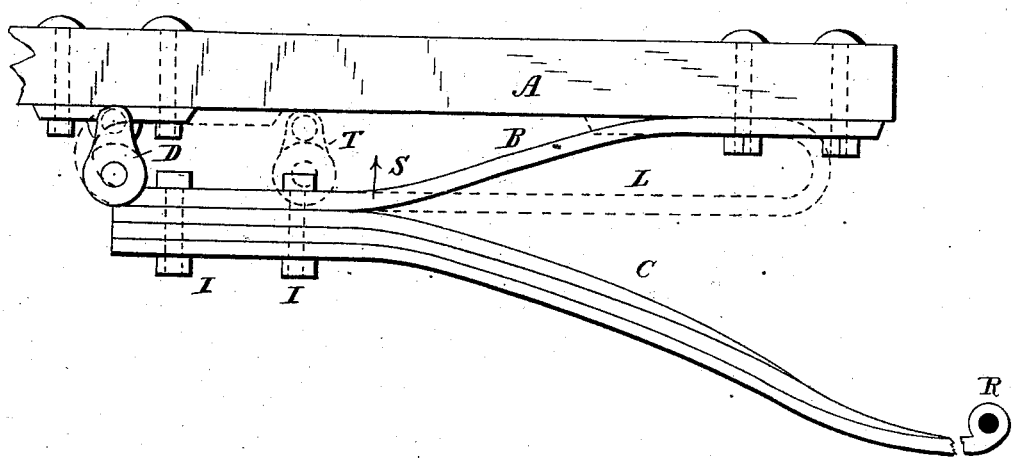
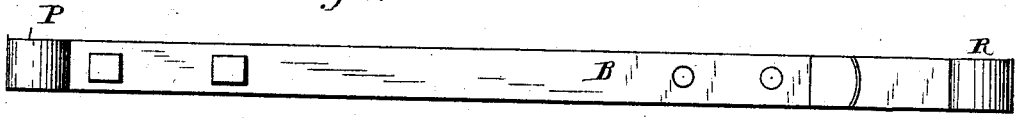
Attest
H. E. Hansmann.
William Paxton
C. W. Saladee
Inventor
By Charles E. Foster

UNITED STATES PATENT OFFICE.

CYRUS W. SALADEE, OF TORRINGTON, CONNECTICUT.

VEHICLE-SPRING.

SPECIFICATION forming part of Letters Patent No. 275,417, dated April 10, 1883.

Application filed January 6, 1883. (No model.)

*To all whom it may concern:*

Be it known that I, C. W. SALADEE, of Torrington, Litchfield county, Connecticut, have invented certain Improvements in Springs for Vehicles, &c., of which the following is the specification.

My invention is a spring for vehicle-bodies and other platforms, consisting of two members, one above the other, the outer ends of which are attached, respectively, to the bottom of the body and to the side bar or frame, on the same side or end, the inner ends of the members being rigidly united and connected to a link-shackle or other suitable bearing secured to the bottom of the platform in such manner that the springs may act freely, according as the upper member is actuated by the movement of the lower member.

My invention consists, further, in the application of the above-described arrangement of spring to road-wagons in which the body-supporting springs are arranged over front and rear axles connected by rigid perches, whereby to assist in carrying the rear half of the body, as well as to prevent its longitudinal movement.

In the drawings, Figure 1 is a side elevation of part of a vehicle, showing a spring attached to the cross-bar. Fig. 2 is a plan view of the spring detached from the cross-bar; and Fig. 3 is a side elevation of so much of an end-elliptic spring vehicle as will show the application to the same of the spring shown in Fig. 1.

A is a spring-bar or other part of the vehicle-body.

B is the upper member of the spring, the outer end of which is attached rigidly to the body.

C is the lower member of the spring, constituting the main supporting-arm, the inner end of which is rigidly attached to the inner end of the upper member, B, by bolts or clips I I, while the outer end of the arm is extended and terminates in the head R, which is to attach to any suitable shackle-bearing on the side bar or any part of the frame of the running-gear.

D is a link-shackle of any suitable kind that will admit of the free endwise play of the spring B. The inner end of the spring B may terminate in a head, P, Fig. 2, with a socket to receive a connecting-bolt. The spring B is made of one or more plates of steel, according as the platform is light or heavy, and the arm C may be rigid or flexible. The spring B is preferably bent into the double curve seen in Fig. 1; but, if preferred, it may be of the shape indicated by dotted lines. The link D may be arranged at either end of the spring B, it being necessary only that one end of this spring shall be rigidly attached to the body, and the other secured in a link-shackle or other equivalent bearing that will admit of its free elongation. A bearing equivalent to the shackle D may be secured by making the fulcrum-spring B into substantially the form indicated by the dotted lines L, Fig. 1, both ends being turned up and rigidly secured to the bottom of the platform. Thus formed, the bent ends will admit of a limited flexion motion to the straight portion, so that when the arm C is brought to bear against the straight portion of the member B a slight yield will occur in the direction of the arrow S; but of course this motion will be limited as compared to the link motion D. When a weight is imposed upon the body, the arm C acts as a lever upon the spring B, bending it in the direction of the arrow S, and at the same time closing the space between A and B and B and C, thereby increasing the bearings in proportion as the load is increased. As the spring B is straightened it is elongated, the link or other flexible connection admitting of such movement. It will be seen that while the extreme inner end of the arm C is firmly held in its relation to the body or bar A the arm C is nevertheless in motion throughout its entire length, and hence a slight movement of the spring B at S is coincident with a greatly-increased motion to the body. Thus a greater degree of vertical motion of the body is permitted with a less play of the springs than can be had when the usual forms of springs are used.

The spring shown in Fig. 1 is not limited in its application to any special kind of platforms.

In Fig. 3, I show the combination of the spring with an end-elliptic spring vehicle, in which the springs B C are longitudinally arranged, the member C being extended to unite with the end spring, U, by means of the shackle-plate V. In this arrangement the spring B C serves as a supplemental spring to afford a more elastic bearing, as well as to prevent the longitudinal movement of the body when the vehicle is suddenly started or stopped, and thus relieve the end springs of all torsional strain. I propose to use this arrangement of supplemental springs B C at either one or at both ends of the vehicle, as circumstances may require.

These springs may be applied to "side-spring buggies"—two on each side—and may be used in connection with side-bar wagons, arranging the springs either longitudinally with the body, inside the bars, or transversely across the bottom of the body, and attached to the side bars on opposite sides.

In all cases where increased length of spring is desired without carrying the link-shackle D inward, the end of the spring may extend beyond the shackle-bearing. (See dotted lines T, Fig. 1.) This may be desirable when a very narrow body is used.

I claim—

1. A spring consisting of two members, one above the other, the outer ends attached, respectively, to the bottom of the platform and to the side bar or frame on the same side or end, the inner ends being rigidly united and connected so as to play longitudinally to the bottom of the platform, substantially as and for the purpose set forth.

2. The combination of the member B with the main supporting member C and link-shackle D, substantially as set forth.

3. In combination with the body A' of an end-elliptic spring road-wagon, the longitudinally-arranged supplemental springs B C, link-shackle D, and end supporting-spring, U, substantially as set forth.

4. The springs B and C and the link-shackle, combined with the body and frame, the springs being extended inward beyond the shackle-bearing, substantially as and for the purpose set forth.

In testimony whereof I have signed my name to this specification in the presence of two subscribing witnesses.

CYRUS W. SALADEE.

Witnesses:
ISAAC W. BROOKS,
CHAS. L. MCNEIL.